United States Patent [19]

Meyniel et al.

[11] 3,871,807

[45] Mar. 18, 1975

[54] DEVICE FOR FORMING TUBES OF THERMOPLASTIC MATERIAL BY EXTRUSION

[75] Inventors: Jean-Pierre Meyniel, Vauvert; Jean-Louis Roulle, Nimes, both of France

[73] Assignee: Pont-A-Mousson S.A., Nancy, France

[22] Filed: Jan. 3, 1973

[21] Appl. No.: 320,783

[30] Foreign Application Priority Data

Jan. 12, 1972 France .............................. 72.00949

[52] U.S. Cl.................. 425/326 R, 425/71, 425/393
[51] Int. Cl........................ B29d 23/03, B29d 23/04
[58] Field of Search........... 425/71, 325, 326 R, 393

[56] References Cited
UNITED STATES PATENTS

| | | |
|---|---|---|
| 2,519,375 | 8/1950 | Jargstorff et al................ 425/326 X |
| 2,902,716 | 9/1959 | Colombo ............................. 425/71 |
| 3,315,308 | 4/1967 | Wiley et al...................... 425/326 X |
| 3,539,670 | 11/1970 | Hall .................................. 425/71 X |
| 3,546,745 | 12/1970 | Ball..................................... 425/71 |

*Primary Examiner*—R. Spencer Annear
*Attorney, Agent, or Firm*—Sughrue, Rothwell, Mion, Zinn & Macpeak

[57] ABSTRACT

The device is adapted to be disposed at the output end of an extruder and comprises a cold die head having an annular chamber formed in the case of the head and surrounding an axial cylindrical extrusion passage. The dimension of the chamber axially of the passage is substantially less than the diameter of the passage. Cooling fluid is fed to the chamber and fluid under pressure is fed to the passage.

6 Claims, 1 Drawing Figure

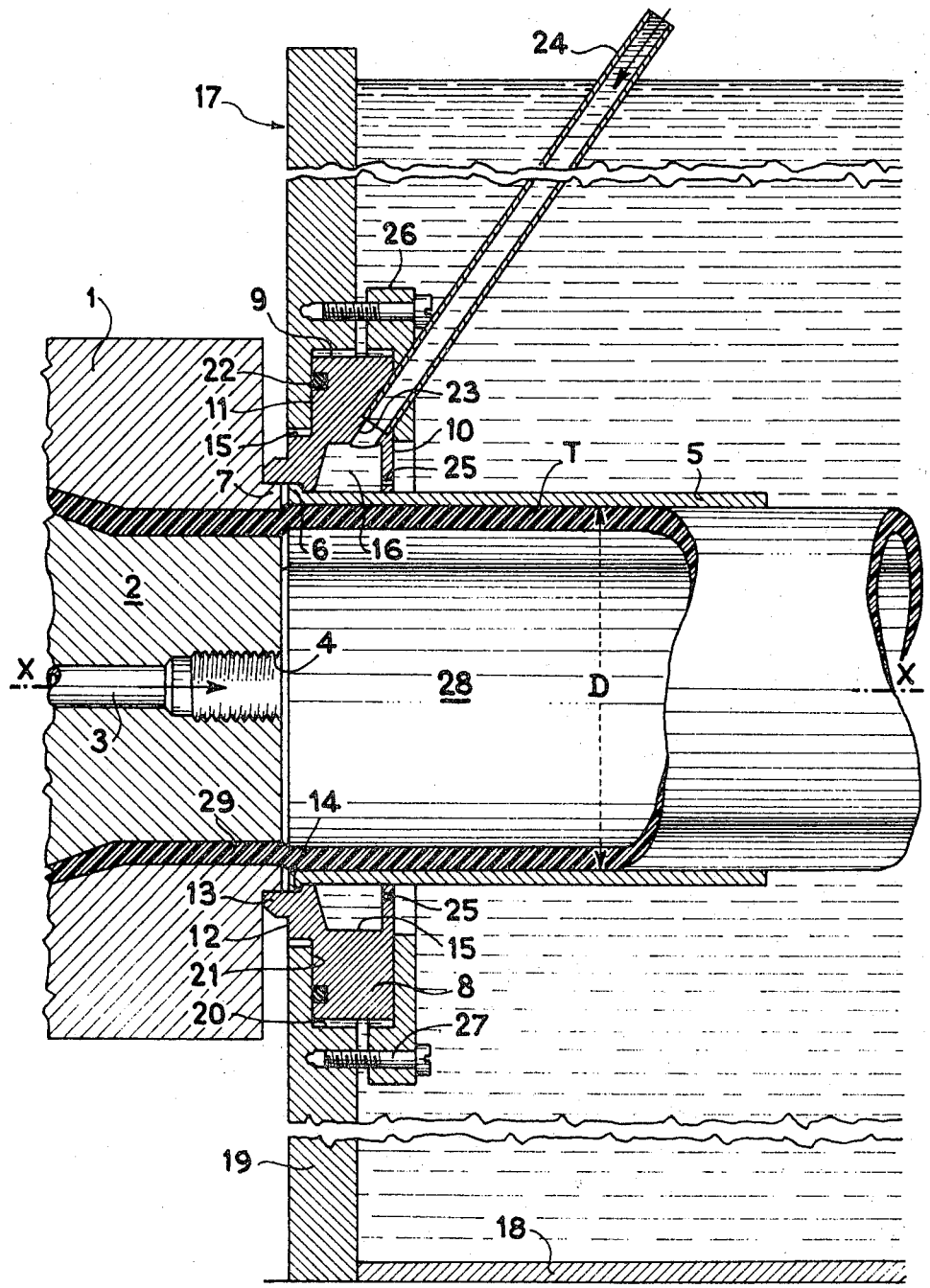

DEVICE FOR FORMING TUBES OF THERMOPLASTIC MATERIAL BY EXTRUSION

The present invention relates to the extrusion of tubes of thermoplastic material.

It is well known that one of the difficulties encountered in such extrusion of tubes of thermoplastic material and in particular rigid polyvinyl chloride, resides in the fact that this extrusion leaves longitudinal internal stresses in the tube. Indeed, when such tubes are used, it is observed that, when they are exposed to certain temperature ranges, a modification of their shape and nominal dimensions occurs. As it has not been possible up to the present time to eliminate this defect completely, owing to insufficient knowledge of its origin, quality standards and regulations have tried to limit the drawbacks thereof by a "shrinkage" test to evaluate the existing longitudinal internal stresses and eliminate the tubes which have such stresses beyond a certain threshold value considered unacceptable to the user.

It is therefore considered that, when the extruded tube passes in succession through a hot die head and a cold die head for calibration under pressure, the considered stresses are created in the wall of the tube in the cold die head. Indeed, in the hot die head, the material, which is at a temperature at which it is plastic and at which consequently the deformations imparted thereto by stress are not reversible, is profiled and approximately dimensioned by the thrust exerted by the extruder through the annular space defined between the hot die head and the punch. On the other hand, in the cold die head following on the hot die head with respect to the travel of the tube, the latter is shaped and calibrated at its exact final dimension by application of compressed air against the inner wall while it is pulled and partially drawn in the downstream direction under the action of a drawing device located beyond the cooling means, such as cooling tanks, in which the tube resumes normal temperature as it travels therethrough. Now, the temperature range the material is in during its presence in the cold die head is precisely that in which any stress exerted on the material deforms it in a reversible manner since the temperature is below the temperature of plastic deformation (about 190°C). However, notwithstanding the fact that these deformations are reversible they do not disappear immediately upon ceasing the stress that creates them, since the tube is in the viscoelastic phase. Consequently, in contradistinction to what occurs at normal temperatures in respect of which only the elasticity is concerned (below a certain stress threshold), a certain period of time is required to resume the shape and dimensions that existed before deformation. If this period of time is not allowed for and the material is prematurely cooled while it is still under tension, stresses are trapped therein and are subsequently released as soon as a heating returns the material to the viscoelastic phase.

Experience has shown that the magnitude of the longitudinal internal stresses depends on several parameters, which are moreover more or less related in their influence, among which are the formulae of the composition, the flow from the extruders, the mixing rate of the extruders (related to the number of their screws), the speed at which the tube travels through the cold die head and the pulling force. A more or less uniform distribution of these stresses has also been observed on the circumference which is related to the centering of the punch in the hot die head, to the evenness of the cooling around the tube and to the distribution of the pull throughout the circumference of the tube.

Various trials and errors have permitted ascertaining among all these parameters a certain equilibrium which permits producing at an economical rate tubes having acceptable shrinkages.

However, the problem has not been solved in respect of high-output extruders which require higher pulling speeds.

Consequently, an object of the present invention is to find a new equilibrium which limits, with everything else being equal, the longitudinal internal stresses to acceptable rates while making it possible to achieve for a given tube dimension large increases in output, for example on the order of 40%.

The invention provides a device for forming tubes of thermoplastic material adapted to be disposed at the output end of an extruder, said device comprising a cold die head having an annular chamber which is formed in a case and surrounds an axial cylindrical passage, the dimension of said chamber in the direction of the extrusion axis being substantially less than the diameter of the cylindrical passage, and means for feeding said chamber with cooling fluid and means for feeding said cylindrical passage with fluid under pressure.

Thus, the cooling achieved is very effective and prevents an excessive rubbing or friction between the wall of the tube and the wall of the cylindrical passage of the cold die head and this reduces the force to be applied for pulling the tube through the die head at sufficient speed.

Further features and advantages of the invention will be apparent from the ensuing description with reference to the accompanying drawing.

In the drawing, the single FIGURE represents an axial sectional view of a device according to the invention.

This FIGURE shows the output end of an extruder having an axis X—X constituted by an annular hot die head 1 and an axial punch ar mandrel 2 which is disposed in said die head and on the axis of which is formed a passage 3 which communicates with a compressed air supply and opens onto the end of the punch by way of an orifice 4.

The cold die head under pressure comprises a cylindrical sleeve 5 having an axis X—X and a length distinctly greater than its inside diameter D which is very slightly greater than the inside diameter of the outlet of the hot die head 1. This sleeve is of steel and machined internally and has at its upstream end, with respect to the direction of travel of the extruded material, an outer flange 6 which faces an annular projection 7 formed on the hot die head 1 and having the same outside diameter as the flange 6.

The cold die head further comprises an annular case or housing 8 having an axis X—X and a cylindrical outer surface 9, a planar annular downstream end surface 10 and an annular upstream end surface 11 which defines an annular projection 12 carrying four centering lugs 13 which engage around the projection 7 of the hot die head 1. The inner surface of the annular case 8, which bears without clearance on the sleeve 5, has an annular shoulder 14 engaged behind the flange 6 and a machined annular cavity 15 which defines with the sleeve 5 an annular chamber 16. The cross-sectional shape of this chamber is a trapezium whose mean width is in the neighbourhood of its height which is of the order of magnitude of one-third or one-fourth of the radius of the sleeve and whose large base faces the sleeve.

This cold die head, comprising the sleeve and case, is disposed in a cooling tank 17 having a bottom wall 18 parallel to the axis X—X and an end wall 19 facing the outlet end of the hot die head 1.

This wall 19 has a circular opening 20 having an axis X—X and a shoulder 21 in which the case 8 is disposed, the cylindrical part 9 of the case 8 being in the widest part of the opening and its projection 12 being in the narrowest part, both with a slight annular transverse clearance, whereas the part of the surface 11 of the case which is outside the projection 12 bears against the shoulder 21 with interposition of a sealing element 22. The transverse clearance provided permits the die head assembly to be positioned with respect to the cooling tank.

The chamber 16 is put in communication with a source of cold water under pressure by way of an aperture 23 and a pipe 24 which extends through the case 8. The chamber 16 also communicates with the interior of the cooling tank by way of apertures 25 of small section arranged on a circle centered on the axis X—X. An annular flange 26 having a shoulder through which the pipe 24 extends is secured by screws 27 to the wall 19 of the tank and thus applies the case 8 tightly against this wall.

The chamber 28 defined by the punch 2 and the sleeve 5 is closed at the downstream end by a rubber closure member (not shown) in the manner conventional in apparatus for extruding tubes under pressure.

The device just described operates in the following manner:

The thermoplastic material issues in the form of a tube 29 through the annular space between the die head 1 and the punch 2. This tube is then applied against the sleeve 5 by the pressure of compressed air in the chamber 28 supplied by way of the passage 3. The supply of cold water under pressure by way of the tube 24 concentrates the essential of the cooling capacity in the annular chamber 16. Moreover, it is discharged to the cooling tank 17 by way of the orifices 25 in the form of jets which create in the mass of water in the tank a turbulence facilitating the cooling and stabilization of the tube. It will be observed that the cold die head 5-8 comes in contact with the hot die head 1 only through the lugs 13 and is therefore carefully insulated therefrom.

As the following examples show, the device according to the invention permits conforming to the required limits of longitudinal internal stresses and obtaining, everything else being equal, an extrusion rate and output rate which are considerably higher than is possible with known devices.

EXAMPLE 1

For a range of pipes having a wall thickness of 3.2 mm manufactured with an ANGER A4-82/84C extruder provided with a conventional K3F extruding die head and a device such as that just described, the linear extruding speeds suitable for shrinkages (denoting the internal stresses) which are maintained within a range of 2.5-3%, the upper acceptable limit being 4%, are the following:

| Nominal Diameter (mm) | Linear speed (metres/hour) | | Improvement (%) |
| --- | --- | --- | --- |
| | Conventional die head | Die head according to the invention | |
| 63 | 124 | 164 | 32 |
| 75 | 126 | 156 | 25 |
| 90 | 105 | 143 | 36 |
| 100 | 76 | 119 | 57 |
| 110 | 66 | 132 | 100 |
| 125 | 77 | 103 | 34 |

The outputs are the following:

| Nominal Diameter (mm) | Output (kg/hour) | | Improvement (%) |
| --- | --- | --- | --- |
| | Conventional die head | Die head according to the invention | |
| 63 | 106 | 139 | 31 |
| 90 | 120 | 168 | 40 |
| 100 | 111 | 165 | 49 |
| 110 | 116 | 196 | 69 |
| 125 | 132 | 187 | 42 |

EXAMPLE 2

With a BANDERA 60 extruder and the same die heads, the shrinkages are improved under the following conditions, while the outputs are increased by about 10-20%:

| Dimension (mm) | Shrinkage (%) | | Improvement (%) |
| --- | --- | --- | --- |
| | Conventional die head | Die head according to the invention | |
| 32 × 30.2 | .5 - 7.5 | 2.5 | 50 - 66 |
| 45 × 42 | 4 - 7 | 1.5 | 62 - 78 |
| 40 × 38.2 | 4 | 2.5 | 37 |

EXAMPLE 3

With an ANGER A4-82 extruder and the same die heads and tube dimensions 110 × 103.6 mm, the results are the following:

| | Conventional die head | Die head according to the invention | Improvement (%) |
| --- | --- | --- | --- |
| output (Kg/hour) | 105 | 206 | 97 |
| shrinkage (%) | 3 - 4.5 | 2 - 2.5 | 17 - 33 |

EXAMPLE 4

With a KESTERMANN K2-107 extruder and the same die heads and a constant shrinkage, the outputs are improved for a dimension 160 × 153.2 mm in the following manner:

| | Conventional die head | Die head according to the invention | Improvement (%) |
| --- | --- | --- | --- |
| Output (kg/hour) | 109 | 148 | 35. |

Having now described our invention what we claim as new and desire to secure by Letters Patent is:

1. A device for forming tubes of thermoplastic material comprising a cooling tank for containing a bath of cooling liquid; a cold die head comprising tubular means having an upstream end and defining a throughway passage, second means defining with said tubular means an annular chamber surrounding a portion of said tubular means adjacent said upstream end, said tubular means being combined with a wall of said tank adjacent said upstream end and putting the interior of said tank in communication with the exterior of said tank, said upstream end of said tubular means being for combination with an annular output end of an extruder so as to put said passage in axial alignment with said extruder annular output end for receiving the tubular extruded material from said extruder, said second means having a downstream end remote from said upstream end of said tubular means and said tubular means having a part extending beyond said downstream end of said second means so that said part of said tubular means is directly exposed to said bath of cooling liquid, said passage being for communication with a source of fluid under pressure for applying the tubular extruded material against said tubular means, means for putting said chamber in communication with a source of cooling liquid and means for discharging cooling liquid from said chamber so as to cool said extruded material indirectly through said portion of said tubular means; and means for supplying a cooling liquid in jet form to said bath of cooling liquid around said part of said tubular means in a region adjacent said downstream end of said second means for creating a turbulence in said bath of cooling liquid around said part of said tubular means.

2. A device for forming tubes of thermoplastic material comprising a cooling tank for containing a bath of cooling liquid, a cold die head comprising tubular means having an upstream end and a downstream end and defining a cylindrical throughway passage, second means defining with said tubular means an annular chamber surrounding a portion of said tubular means adjacent said upstream end, said tubular means being combined with a wall of said tank adjacent said upstream end and putting the interior of said tank in communication with the exterior of said tank, said upstream end of said tubular means being for combination with an annular output end of an extruder so as to put said passage in axial alignment with said extruder annular output end for receiving the tubular extruded material from said extruder, said second means having a downstream end remote from said upstream end of said tubular means and said tubular means having a part extending beyond said downstream end of said second means so that said part of said tubular means is directly exposed to said bath of cooling liquid, said passage being for communication with a source of fluid under pressure for applying the tubular extended material against said tubular means, means for putting said chamber in communication with a source of cooling liquid so as to cool said extruded material indirectly through said portion of said tubular means, means defining a series of equally-spaced orifices disposes around and adjacent said tubular means and adjacent said downstream end of said second means for putting said chamber in communication with the interior of said tank and producing jets of said cooling fluid which issue from said chamber and create turbulence in said bath of cooling liquid around said part of said tubular means, said chamber having a length axially of said tubular means which length is a minor fraction of the diameter of said passage and a minor fraction of the axial length of said part of said tubular means.

3. A device as claimed in claim 2, wherein said hot die head includes a mandrel having a passageway for putting said cylindrical passage in communication with said source of fluid under pressure.

4. A device as claimed in claim 2, wherein said second means is in the form of an annular housing and said annular chamber is defined by a cavity in the housing, which housing has a cylindrical axial opening communicating with said cavity, and by said tubular means which is in the form of a cylindrical sleeve which is disposed in said cylindrical axial opening and has an inner surface defining said cylindrical passage.

5. A device as claimed in claim 2, further comprising a hot die head disposed upstream of the cold die head with respect to the travel of the thermoplastic material, said cold die head being substantially insulated from the hot die head.

6. A device as claimed in claim 5, wherein said second means is in the form of an annular housing which has projections having a very small section with respect to the diameter of the cylindrical passage, the annular housing being adapted to bear against the hot die head through said projections.

* * * * *